United States Patent [19]
Gloser et al.

[11] Patent Number: 4,662,253
[45] Date of Patent: May 5, 1987

[54] MACHINE BED

[75] Inventors: Wolfgang Gloser, Börtlingen; Siegfried Kuhn, Dürnau; Robert Räder, Göppingen; Friedhelm Setzer, Göppingen; Hermann Kienhöfer, Göppingen; Werner Mühlich, Süssen, all of Fed. Rep. of Germany

[73] Assignee: Oerlikon-Boehringer GmbH, Göppingen, Fed. Rep. of Germany

[21] Appl. No.: 684,927

[22] PCT Filed: Apr. 4, 1984

[86] PCT No.: PCT/EP84/00095
  § 371 Date: Dec. 17, 1984
  § 102(e) Date: Dec. 17, 1984

[87] PCT Pub No.: WO 84/04067
  PCT Pub. Date: Oct. 25, 1984

[30] Foreign Application Priority Data

Apr. 18, 1983 [DE] Fed. Rep. of Germany ....... 3313980

[51] Int. Cl.⁴ .............................................. B23B 17/00
[52] U.S. Cl. ....................................................... 82/32
[58] Field of Search .................. 82/2 R, 32; 408/234; 409/235

[56] References Cited

U.S. PATENT DOCUMENTS

| | | | |
|---|---|---|---|
| 1,414,176 | 4/1922 | Carroll | 82/32 |
| 1,526,241 | 2/1925 | Schneider | 82/32 |
| 2,993,399 | 7/1961 | Musil | 82/32 |
| 3,372,613 | 3/1968 | Feld | 82/32 |

FOREIGN PATENT DOCUMENTS

| | | |
|---|---|---|
| 413357 | 5/1925 | Fed. Rep. of Germany . |
| 975695 | 6/1953 | Fed. Rep. of Germany . |
| 977621 | 1/1956 | Fed. Rep. of Germany . |
| 1089244 | 9/1960 | Fed. Rep. of Germany . |
| 1157956 | 6/1958 | France . |

Primary Examiner—Nicholas P. Godici
Assistant Examiner—Jerry Kearns

[57] ABSTRACT

A machine bed for machine tools having two guides lying in separate planes each having two guide ways, namely an approximately horizontal main guide and an additional guide at an angle thereto, in which at least the guide ways of the main guide lie on intersecting tangents or parallels thereof, of a circle whose center is the same as the workpiece and/or tool center of rotation of the machine. To prevent instability of the component groups on the main guide, even in the case of workpieces of great weight and of the occurrence of high machining forces, it is proposed that the intersection M of the perpendiculars of force N-1, B-2, resulting upon the thrust of the component groups on the main guide, be offset from the center of gravity S of a workpiece 16 being machined, such that cumulative torques M-1, M-2, resulting on the basis of the workpiece weight and the machining force FR of the workpiece 15, which will force the component groups carried on the main guide 11, 12, against the rear guide way 12 remote from the operator side A.

1 Claim, 1 Drawing Figure

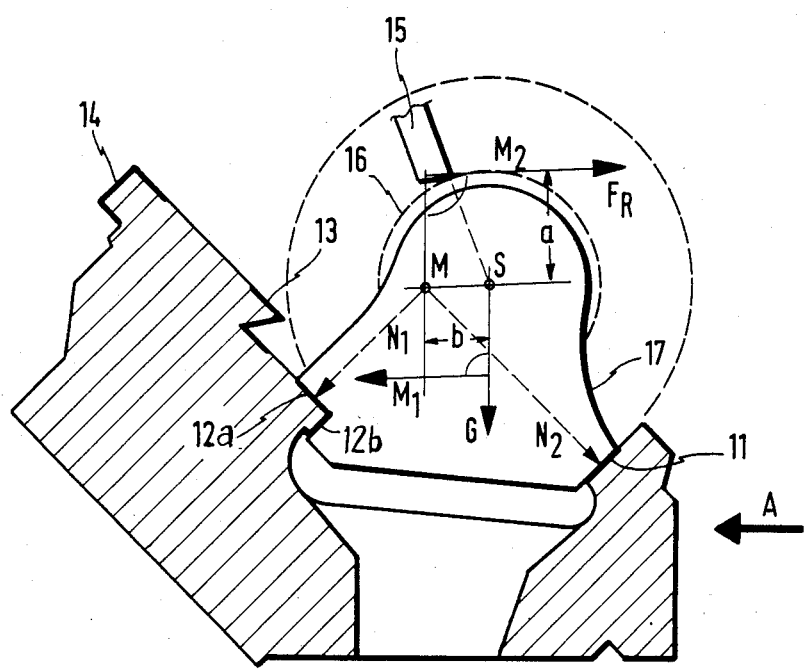

MACHINE BED

BACKGROUND OF THE INVENTION

The invention relates to a machine bed having two guides lying in separate planes and having two guides ways each, namely an approximately horizontal main guide, e.g., for the headstock and tailstock of a turning machine, and a guide at an angle thereto, for machine tools such as turning machines, milling machines, boring machines and the like, having several machine component groups such as headstock, tailstocks, tool rests, center rests, tool turrets, saddles, steady rests, coolant feeding means, manipulating means and the like. At least the guide ways of the main guide lie on intersecting tangents or parallels to tangents of a circle whose center is the same as the center of rotation of the workpiece and/or tool of the machine.

Machine beds for machine tools are known in a variety of forms. The two guides can be constructed with their two guide ways lying in one plane, so that an angle of 180° results between the two planes of guidance of the two guides. The two guides can also be offset from one another by more or less than 180°.

All guides having an angle of more than 180° between the two guides have the disadvantage that the distances of the guide ways from the workpiece and/or tool center of rotation are relatively great in comparison to bed guides of less than 180°. This has the disadvantage that the machine components reaching from the bed guides to the center of rotation, such as headstocks, tailstocks, center rests and steady rests, saddles, turrets, slides, coolant feeders, workpiece feeding systems, manipulating means and the like, must have relatively large dimensions, resulting in higher machining costs, greater weights, lower rigidity due to longer lever arms, greater production tolerances and greater thermal expansions.

German Pat. No. 975,695 discloses a machine bed having two guides lying in separate planes, each guide having two guide ways, for machine tools, in which the guide ways of the one guide lie on intersecting tangents of a circle whose center is the same as the center of rotation of the workpiece and/or tool. If, in the case of a turning machine, the main guide which bears the headstock and tailstock is constructed in this manner, a collecting passage can be created between the ways of this guide for the chips formed by the machining.

In such an arrangement of the guide ways of the main guide, torques can occur, in the case of workpieces of great weight and of the occurrence of high machining forces, by which the components carried on the main guide may assume an unstable state or even be exposed to forces tending to lift these components away from the main guide. This can result in chattering and in rough running of the machine while cutting.

The invention is addressed to the problem of constructing the machine of the above-mentioned kind such that a reliable guidance of the components carried on the main guide will result.

BRIEF SUMMARY OF THE INVENTION

This problem is solved in accordance with the invention by having the intersection of the perpendiculars of forces which result when the component groups thrust against the main guide, offset from the center of gravity of a workpiece being machined, such that cumulative torques are produced on the basis of the workpiece weight and the machining force of the tool which thrust the component groups carried on the main guide against the rear guide way remote from the operator side.

DESCRIPTION OF THE DRAWING

The invention is explained hereinbelow by way of example, with the aid of the appended drawing which represents diagrammatically an end view of a turning machine.

The machine bed of the diagrammatically represented turning machine has a main guide with two guide ways 11, 12. Guide way 11 and guide surface 12a of guide way 12 lie on tangents to a circle whose center S coincides with the center of gravity of a workpiece represented in broken lines. Guides surface 12b of guide way 12 faces downwardly. Additional component groups can be disposed on an additional guide consisting of two guide ways 13 and 14.

The perpendiculars of force $N_1$ and $N_2$ against the guide way 11 and 12a of the main guide intersect at a point M which is at a distance b from the center of gravity S of the workpiece 16, or from the center of the circle whose diameter is at least equal to that of the largest possible circumferential circle of the workpiece. The guide way 11 and surface 12a of guide way 12 lie on tangents of this circle.

A tool 15 engaging the workpiece 16 exerts on the workpiece a force $F_R$ whose line of action is at a distance a from the center of gravity S.

In this arrangement, two torques $M_1$ and $M_2$ are produced, namely on based on the weight of the workpiece and one based on the force $F_R$ exerted by the tool, which add to one another and force the component groups carried on the main guide 11, 12, against surface 12b of guide way 12 more remote from the operator side A.

By this construction it is brought about that the component groups mounted on the main guide bear firmly against the corresponding guidance surfaces, and bear against these surfaces even when great machining forces are produced, and the result is smooth operation of the machine even when the tool is producing great chip thicknesses, so that a high precision can always be assured.

We claim:

1. A machine bed of a machine tool having a component with a spindle axis for rotatably supporting a workpiece, said machine bed comprising: guiding means on said machine bed for said component, said guiding means having a first guide way, and a second guide way, said first guide way having a plane first guide surface; said second guide way having a plane first guide surface, and a plane second guide surface transverse to said first guide surface; the plane guide surface of said first guide way, and the first guide surface of said second guide way lying on intersecting tangents of a circle around said spindle axis, said circle having a center which is coincident with the center of gravity of the workpiece, said component having a first component surface engaging said first guide way, a second component surface engaging said first guide surface and a third component surface engaging said second guide surface, the centerlines of forces exerted by said component first and second component surfaces on said first guide way and said first guide surface respectively intersecting at a point offset horizontally from a vertical plane through said spindle axis, towards said second guide way, such that torques produced by the weight of said component and a workpiece supported thereon and by a machining force thrust said third component engaging surface against said second guide surface, to thereby prevent lifting of the component from said guide means.

* * * * *